US010399113B2

(12) United States Patent
Jansen et al.

(10) Patent No.: US 10,399,113 B2
(45) Date of Patent: *Sep. 3, 2019

(54) HEAT-CURABLE POWDER COATING COMPOSITION

(71) Applicant: DSM IP ASSETS B.V., Heerlen (NL)

(72) Inventors: Johan F. G. A. Jansen, Geleen (NL); Leendert Jan Molhoek, Nunspeet (NL); Jan Pieter Drijfhout, Steenwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 105 days.

This patent is subject to a terminal disclaimer.

(21) Appl. No.: 14/863,383

(22) Filed: Sep. 23, 2015

(65) Prior Publication Data

US 2016/0009950 A1    Jan. 14, 2016

Related U.S. Application Data

(63) Continuation of application No. 13/127,261, filed as application No. PCT/EP2009/064727 on Nov. 6, 2009, now abandoned.

(60) Provisional application No. 61/112,390, filed on Nov. 7, 2008, provisional application No. 61/112,384, filed on Nov. 7, 2008.

(30) Foreign Application Priority Data

| Dec. 19, 2008 | (EP) | 08172327 |
| Mar. 25, 2009 | (EP) | 09156130 |
| Mar. 25, 2009 | (EP) | 09156131 |
| Mar. 25, 2009 | (EP) | 09156137 |
| Mar. 25, 2009 | (EP) | 09156139 |
| Mar. 25, 2009 | (EP) | 09156142 |

(51) Int. Cl.
  *C09D 167/06* (2006.01)
  *B05D 1/06* (2006.01)

(52) U.S. Cl.
  CPC ............ *B05D 1/06* (2013.01); *C09D 167/06* (2013.01)

(58) Field of Classification Search
  CPC .................. C09D 167/06; B05D 1/06
  USPC ......................................... 525/418
  See application file for complete search history.

(56) References Cited

U.S. PATENT DOCUMENTS

| 5,304,332 A | 4/1994 | Richart |
| 5,480,726 A | 1/1996 | Richart |
| 5,763,099 A | 6/1998 | Misev |
| 5,922,473 A | 7/1999 | Muthiah et al. |
| 6,005,007 A | 12/1999 | Farmer et al. |
| 6,005,017 A | 12/1999 | Daly et al. |
| 6,017,593 A | 1/2000 | Daly et al. |
| 6,017,640 A | 1/2000 | Muthiah |
| 6,048,949 A | 4/2000 | Muthiah et al. |
| 6,194,525 B1 | 2/2001 | Ortiz et al. |
| 6,235,228 B1 | 5/2001 | Nicholl et al. |
| 6,291,581 B1* | 9/2001 | Bayards ............... C09D 167/06 523/526 |
| 2003/0017565 A1 | 1/2003 | Echigo et al. |
| 2006/0003109 A1 | 1/2006 | Bischof et al. |
| 2006/0182975 A1* | 8/2006 | Burbank ................ B05D 1/045 428/420 |
| 2008/0275203 A1 | 11/2008 | Jansen et al. |
| 2011/0262637 A1 | 10/2011 | Jansen et al. |
| 2011/0269908 A1 | 11/2011 | Jansen et al. |
| 2011/0274833 A1 | 11/2011 | Jansen et al. |
| 2016/0009949 A1 | 1/2016 | Jansen et al. |
| 2016/0017153 A1 | 1/2016 | Jansen et al. |

FOREIGN PATENT DOCUMENTS

| EP | 0 431 656 | 6/1991 |
| EP | 0 636 669 | 2/1995 |
| EP | 0 844 286 | 5/1998 |
| EP | 0 636 669 B1 | 4/1999 |
| EP | 0 942 050 | 9/1999 |
| EP | 0 957 141 | 11/1999 |
| EP | 0 957 142 | 11/1999 |
| EP | 1 195 392 | 4/2002 |
| EP | 1 195 393 | 4/2002 |
| EP | 1 023 353 B1 | 2/2004 |
| EP | 1 398 357 | 3/2004 |
| EP | 1 424 142 | 6/2004 |
| EP | 1 477 534 | 11/2004 |
| JP | 47-026189 | 7/1972 |

(Continued)

OTHER PUBLICATIONS

Beuth, http://www.beuth.de/en/standard/din-16945/1416432, accessed Feb. 18, 2019 (Year: 2019).*
Gostinfo, http://www.gostinfo.ru/catalog/Details/?id=4033527, accessed Feb. 18, 2019 (Year: 2019).*
DSM Resins (Product data Sheet for 3125, Unsaturated Polyester) (Jul. 13, 2016).
International Preliminary Report on Patentability for PCT/EP2009/064728, dated Dec. 23, 2010.
International Search Report for PCT/EP2009/064728, dated Mar. 31, 2010.

(Continued)

*Primary Examiner* — David T Karst
(74) *Attorney, Agent, or Firm* — Nixon & Vanderhye P.C.

(57) ABSTRACT

The disclosure relates to a heat curable powder coating composition suitable for being cured at a temperature from 60 to 130° C. containing: a thermal initiation system and a resin system, wherein the reactivity of the thermal initiation system is such that the thermal initiation system provides a geltime between 2.5 and 1000 minutes at 60° C. in butane diol-dimethacrylate as measured according to DIN 16945 using 1 wt % of the thermal initiation system in 99 wt % of butane dioldimethacrylate, wherein the amount of thermal initiation system is chosen such that when the powder coating composition is applied to a substrate and cured at a temperature of 130° C. for 20 minutes.

54 Claims, No Drawings

(56) References Cited

FOREIGN PATENT DOCUMENTS

| JP | 55-27324 | 2/1980 |
|---|---|---|
| WO | 97/27253 | 7/1997 |
| WO | 97/38034 | 10/1997 |
| WO | 99/14254 | 3/1999 |
| WO | 02/100957 | 12/2002 |
| WO | 2006/082080 | 8/2006 |
| WO | 2007/045609 | 4/2007 |
| WO | 2007/134736 | 11/2007 |
| WO | 2010/052290 | 5/2010 |
| WO | 2010/052291 | 5/2010 |
| WO | 2010/052293 | 5/2010 |
| WO | 2010/052294 | 5/2010 |
| WO | 2010/052295 | 5/2010 |
| WO | 2010/052296 | 5/2010 |

OTHER PUBLICATIONS

Database WPI Week 198015, *Thomson Scientific* & JP 55 027324, Feb. 1980, Abstract (1 page).

International Search Report for PCT/EP2009/064730, dated Mar. 15, 2010.

International Preliminary Report on Patentability for PCT/EP2009/064730, dated Jan. 13, 2011.

International Search Report for PCT/EP2009/064727, dated Apr. 20, 2010.

DSM Product Data Sheet, Unsaturated, Polyester Resin, Uracross P3125, accessed Aug. 11, 2014.

DSM, Product Data Sheet for Uracross P3125, Unsaturated, Polyester Resin, Tg, accessed Feb. 10, 2014.

* cited by examiner

HEAT-CURABLE POWDER COATING COMPOSITION

This application is a continuation of commonly owned U.S. application Ser. No. 13/127,261, filed Jul. 25, 2011 (now abandoned), which is the national phase of International Application No. PCT/EP2009/064727 filed Nov. 6, 2009, which designated the U.S. and claims priority to U.S. Provisional Application Nos. 61/112,390 and 61/112,384 both filed on Nov. 7, 2008, EP Application Nos. 08172327.2 filed Dec. 19, 2008, Ser. No. 09/156,130.8, 09156139.9, 09156137.3, 09156142.3 and 09156131.6 all filed on Mar. 25, 2009, the entire contents of each of which are hereby incorporated by reference.

The invention relates to a heat-curable powder coating composition, a process for the preparation thereof, use of the powder coating composition to coat a substrate therewith, a substrate coated with the powder coating composition and a process for coating a substrate using the powder coating composition.

As shown by the article "Overview of the powder coatings market worldwide" by G. Maggiore in Pitture e Vernice Europe 1/92, pp. 15-22 and by the lecture by D. Richart "Powder Coating: Current Developments, Future Trends" (Waterborne, High-Solids and Powder Coatings Symposium, Feb. 22-24, 1995), the search is still continuing for powder coating compositions which can be cured with little thermal stress of the substrate and which consequently are suitable for use on heat-sensitive substrates such as, for example, wood and plastic.

Besides the desire for a powder coating composition that can be cured at low temperature, it is also desired that such a powder coating composition can still be processed in an extruder.

Therefore, there is a need for a powder coating composition that balances the ability to be cured at a low temperature of for example 60 to 130° C. thereof with a good processability in an extruder.

It is the object of the present invention to provide a heat curable powder coating composition which is easily processable in the extruder and which can be partially or fully thermally cured at low temperatures, for example between 60-130° C., making it suitable for use not only for non heat-sensitive substrates, but in particular also for heat-sensitive substrates.

This object is achieved by the powder coating compositions of the invention. In one embodiment, the invention relates to a heat curable powder coating composition suitable for being cured at a temperature from 60 to 130° C. comprising:
  a thermal initiation system and a resin system
  wherein the reactivity of the thermal initiation system is such that the thermal initiation system provides a geltime between 2.5 and 1000 minutes at 60° C. in butane diol-dimethacrylate as measured according to DIN 16945 using 1 wt % of thermal initiation system in 99 wt % of butane diol-dimethacrylate
  wherein the amount of thermal initiation system is chosen such that when the powder coating composition is applied to a substrate and cured at a temperature of 130° C. for 20 minutes, the resulting coating resists at least 50 acetone double rubs
  wherein the resin system comprises a resin and a co-crosslinker
  wherein the resin contains reactive unsaturations and wherein said reactive unsaturations are carbon carbon double bonds connected directly to an electron withdrawing group
  wherein the co-crosslinker is chosen from the group of acrylates, methacrylates, vinylesters, vinylethers, vinyl amides, alkyn ethers, alkyn esters, alkyn amides, alkyn amines, propargyl ethers, propargyl esters, itaconates, enamines and mixtures thereof
  wherein the weight per unsaturation in the resin system as measured using $^1$H NMR is between 100 and 1000 g/mole and
  wherein the powder coating composition is a one component system.

In another embodiment, the invention relates to a heat curable powder coating composition suitable for being cured at a temperature from 60 to 130° C. comprising:
  a thermal initiation system and a resin system
  wherein the reactivity of the thermal initiation system is such that the thermal initiation system provides a geltime between 2.5 and 1000 minutes at 60° C. in butane diol-dimethacrylate as measured according to DIN 16945 using 1 wt of the thermal initiation system in 99 wt % butane diol-dimethacrylate,
  wherein the amount of thermal initiation system in the powder coating composition is chosen such that the curing reaction enthalpy peak of the powder coating composition is at most 60 minutes at 120° C. and at least 2.5 minutes at 60° C. after the start of an isothermal DSC
  wherein the resin system comprises a resin and a co-crosslinker
  wherein the resin contains reactive unsaturations and wherein said reactive unsaturations are carbon carbon double bonds connected directly to an electron withdrawing group
  wherein the co-crosslinker is chosen from the group of acrylates, methacrylates, vinylesters, vinylethers, vinyl amides, alkyn ethers, alkyn esters, alkyn amides, alkyn amines, propargyl ethers, propargyl esters, itaconates, enamines and mixtures thereof
  wherein the weight per unsaturation in the resin system is between 100 and 900 g/mole and
  wherein the powder coating composition is a one component system.

With easily processable in the extruder is meant that the powder coating composition can be extruded to form an extrudate without forming gel particles, preferably without forming a gel.

Additional advantages of the composition of the present invention may be acceptable flow and/or acceptable storage stability, for example the powder coating composition of the present invention may be physically and chemically storage stable for at least 6 weeks at 4° C.

With heat curable is meant within the framework of the current invention that curing of the powder coating composition can be effected by using heat. A thermal initiation system is present in the composition of the present invention to make this heat curing possible. Heat curing has the advantage that in a one step process of heating a powder coating composition without the use of additional equipment, for instance equipment that generates UV light or accelerated electrons, the powder coating can be melted and cured onto a substrate, whereas with radiation curing of a powder coating composition on a substrate two steps are needed to melt and cure a powder coating on a substrate. In such a two step of radiation curing, first the powder coating composition is melted onto the substrate using heat, after which it is cured using UV or electron beam irradiation. Heat curing is especially desirable for coating 3D objects.

Preferably, the powder coating composition of the present invention is cured at a temperature of from 60 to 130° C. More preferably, the curing temperature is at least 65° C., even more preferably at least 70° C., for example at least 75° C., for example at least 80° C. More preferably, the curing temperature is at most 125° C., even more preferably at most 120° C., in particular at most 115° C., in particular at most 110° C., for example at most 105° C. or for example at most 100° C. In special cases, for example for substrates that are more heat-sensitive, it may be of advantage to cure the powder coating composition at an even lower temperature, for example at a temperature lower than 100° C., lower than 95° C., lower than 90° C. or even lower than 85° C.

For the purpose of the invention with one acetone double rub (ADR) is meant one back and forward movement over the surface of a coating having a thickness of approximately 60 µm using a cotton cloth drenched in acetone, which cotton cloth covers a hammer head having a weight of 980 gram and a contact surface area with the coating of 2 cm$^2$. Every 20 rubs the cloth is drenched in acetone. The measurement is continued until the coating is removed (and the obtained ADR number is noted down) or until 100 ADR are reached.

Preferably, a coating prepared from a powder coating composition of the present invention resists at least 60 ADR, for example at least 70 ADR, at least 80 ADR, at least 90 ADR or at least 100 ADR when the coating composition is applied to a substrate, for example an aluminum substrate (for example an ALQ panel) and is cured at a temperature of 130° C.

With 'powder coating composition' is meant a composition that can be applied to a substrate as a dry (without solvent or other carrier) finely divided solid, which when melted and fused, forms a continuous film that adheres to the substrate.

With a 'one component system' as used herein, also called a 1K system, is meant that all (reactive) components of the powder coating composition form part of one powder. This as opposed to a two component system, also called 2K system, wherein the powder coating composition is composed of at least two different powders with different chemical compositions, which keeps the reactive components physically separated. The at least two different powders may be mixed in a physical blend before the powder coating composition is put in the storage container or may be mixed just before applying the 2K system to a substrate to let a curing reaction take place. The compositions of the at least two different powders in the 2K system are usually selected such that each powder contains an ingredient which is needed for curing but is absent from the other powder(s). This separation allows preparation of the individual powder composition in a heated state (such as by melt mixing) without the initiation of the cure reaction.

With the term 'thermal initiation system' as used herein is meant the system that triggers the radical polymerization of the reactive unsaturations in the resin and the co-crosslinker. The thermal initiation system comprises a radical initiator. Initiation systems suitable for use in the present invention are initiation systems that in the 'BDDMA test' as described herein have a geltime of between 2.5 and 1000 minutes. Preferably a thermal initiation system having a geltime of at least 4 minutes, more preferably having a geltime of at least 6 minutes and/or at most 800 minutes, for example at most 600, for example at most 400, for example at most 200 minutes, is used.

Depending on the reactivity of the initiation system besides the initiator, one or more inhibitors and/or one or more accelerators and/or one or more co-accelerators may optionally be present in the initiation system such that the geltime of the initiation system as measured with the BDDMA test as described herein is between 2.5 and 1000 minutes.

The reactivity of the initiation system is determined herein using the 'BDDMA test'. In this test 1 wt % of initiation system is dissolved in 99 wt % of butane diol-dimethacrylate (BDDMA) and the time it takes for the BDDMA to cure (the geltime) is measured at 60° C. using DIN 16945 (section 6.2.2.2), hereby incorporated by reference.

The curing of the powder coating composition according to the invention takes place by means of heat; that is the powder coating composition is heat curable. The thermal initiator in the thermal initiation system upon heating generates (free) radicals able to initiate polymerization of the reactive unsaturations in the resin in combination with the unsaturated groups in the co-crosslinker or the polymerization of the reactive unsaturations in the resins. Solid initiators are preferred over liquid ones.

Flow characteristics (flow) of the powder coating compositions on the substrate can be determined by comparing the flow of the coating with PCI Powder Coating Flow panels (ACT Test Panels Inc., APR22163 (A) Batch: 50708816) at a coating thickness of approximately 75 µm. The rating of flow is from 1 to 10, with 1 representing the roughest coating and 10 representing the coating with the best flow.

The terms 'thermal initiator', 'radical initiator' and 'initiator' are used interchangeably herein.

The radical initiator may be any radical initiator known to the person skilled in the art. Examples of radical initiators include, but are not limited to azo compounds such as for example azo isobutyronitrile (AIBN), 1,1'-azobis(cyclohexanenitrile), 1,1'-azobis(2,4,4-trimethylpentane), C—C labile compounds such as for example benzpinacole, peroxides and mixtures thereof.

Preferably, the initiator in the initiating system is a peroxide. The peroxide may for example be a percarbonate, a perester or a peranhydride. Suitable peranhydrides are for example benzoylperoxide (BPO) and lauroyl peroxide (commercially available as Laurox™). Suitable peresters are for instance t-butyl per benzoate and 2-ethylhexyl perlaurate. Suitable percarbonates are for example di-t-butylpercarbonate and di-2-ethylhexylpercarbonate or monopercarbonates.

The choice of peroxide is in principle not critical and can be any peroxide known to the person skilled in the art for being suitable for use in radical curing of unsaturated resins. Such peroxides include organic and inorganic peroxides, whether solid or liquid (including peroxides on a carrier); also hydrogen peroxide may be applied. Examples of suitable peroxides include for example, peroxy carbonates (of the formula —OC(O)O—), peroxyesters (of the formula —C(O)OO—), diacylperoxides, also known as peranhydride (of the formula —C(O)OOC(O)—), dialkylperoxides or perethers (of the formula —OO—), hydroperoxides (of the formula —OOH), etc. The peroxides may also be oligomeric or polymeric in nature. An extensive series of examples of suitable peroxides can be found, for instance in US 2002/0091214-A1, paragraph [0018], hereby incorporated by reference.

Preferably, the peroxide is chosen from the group of organic peroxides. Examples of suitable organic peroxides are: tertiary alkyl hydroperoxides (such as, for instance, t-butyl hydroperoxide), other hydroperoxides (such as, for instance, cumene hydroperoxide), special class of hydroperoxides formed by the group of ketone peroxides (perketones, being an addition product of hydrogen peroxide and a ketone, such as, for instance, methyl ethyl ketone peroxide, methyl isobutylketone peroxide and acetylacetone peroxide), peroxyesters or peracids (such as, for instance, t-butyl peresters, benzoyl peroxide, peracetates and perbenzoates, lauroyl peroxide, including (di)peroxyesters, -perethers (such as, for instance, peroxy diethyl ether). It is of course also possible to use mixtures of peroxides in the powder coating composition of the present invention. Also, the peroxides may be mixed peroxides, i.e. peroxides containing any two different peroxy-bearing moieties in one molecule.

Especially suitable for use in the present invention are any of the following initiators: peranhydrides, for example benzoyl peroxide or lauroyl peroxide; peroxydicarbonates, for example di(4-t-butylcyclohexyl)-peroxydicarbonate, dicetyl peroxydicarbonate, dimyristylperoxydicarbonate.

In case the reactivity of the initiation system is too high, that is the BDDMA test shows a geltime of less than 2.5 minutes, one or more inhibitors may be added to the initiation system. Alternatively, the inhibitor may be added during the resin synthesis.

Examples of inhibitors are preferably chosen from the group of phenolic compounds, stable radicals, catechols, phenothiazines, hydroquinones, benzoquinones or mixtures thereof.

Examples of phenolic compounds include 2-methoxyphenol, 4-methoxyphenol, 2,6-di-t-butyl-4-methylphenol, 2,6-di-t-butylphenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

Examples of stable radicals include 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL and galvinoxyl(2,6-di-tert-butyl-α-(3,5-di-tert-butyl-4-oxo-2,5-cyclohexadien-1-ylidene)-p-tolyloxy).

Examples of catechols include catechol, 4-t-butylcatechol, and 3,5-di-t-butylcatechol.

Examples of hydroquinones include hydroquinone, 2-methylhydroquinone, 2-t-butylhydroquinone, 2,5-di-t-butylhydroquinone, 2,6-di-t-butylhydroquinone, 2,6-dimethylhydroquinone and 2,3,5-trimethylhydroquinone.

Examples of benzoquinones include benzoquinone, 2,3,5,6-tetrachloro-1,4-benzoquinone, methylbenzoquinone, 2,6-dimethylbenzoquinone, and napthoquinone.

Other suitable inhibitors may for example be chosen from the group of an aluminium-N-nitrosophenyl hydroxylamine, a diethylhydroxylamine and a phenothiazine.

It is also possible to use a mixture of (the above mentioned) inhibitors. Preferably as an inhibitor hydroquinones or catechols are used, depending on the choice of (type and amount of) transition metal compound. In case the reactivity of the initiation system is too low, that is the BDDMA test shows a geltime of more than 1000 minutes, one or more accelerators may be added to the initiation system.

The accelerator may be chosen from the group of amines preferably tertiary amines or aromatic amines: diamines, polyamines, acetoacetamides, ammonium salts, transition metal compounds or mixtures thereof. There are some preferred combinations of initiator and accelerator as is explained below.

If a peroxide compound comprising a structure of formula —C(O)OO— (a perester, percarbonate, including peroxypolycarbonate; peranhydride, peroxyacids and the like) is used, as an accelerator preferably a tertiary aromatic amine or a transition metal compound may be used, the latter optionally in combination with a co-accelerator.

If a peroxide compound comprising a structure of formula —OOH (hydroperoxides, including perketones and the like) is used, as an accelerator preferably a transition metal is used, optionally in combination with a co-accelerator.

If a peroxide compound comprising a structure of formula —OO— (perethers and the like) is used, as an accelerator preferably a transition metal is used, preferably in combination with a co-accelerator.

Suitable tertiary aromatic amine accelerators include N,N-dimethylaniline, N,N-diethylaniline; toluidines and xylidines such as N,N-diiosopropanol-para-toluidine, N,N-dimethyl-p-toluidine, N,N-bis(2-hydroxyethyl)xylidine, N,N-dimethylnaphtylamine, N,N-dimethyl toluidine and ethyl N,N-dimethylamino benzoate.

Also, the accelerator may be chosen from the group of transition metal compounds of transition metals with atomic numbers from/equal to 21 and up to/equal to 79. In chemistry and physics, the atomic number (also known as the proton number) is the number of protons found in the nucleus of an atom. It is traditionally represented by the symbol Z. The atomic number uniquely identifies a chemical element. In an atom of neutral charge, the atomic number is equal to the number of electrons. Examples of suitable transition metal compounds are those of the following transition metals Sc, Ti, V, Cr, Mn, Fe, Co, Ni, Cu, Zn, Mo, W, etc., preferably Mn, Fe, Co or Cu.

The transition metal compounds are preferably chosen from the group of transition metal salts or complexes or mixtures thereof, preferably from the group of organic metal salts or complexes, most preferably organic acid metal salts or derivatives thereof, for example transition metal carboxylates or transition metal acetoacetates, for example transition metal ethylhexanoate. If a copper compound is used, it may for example be in the form of a copper$^+$ salt or a copper$^{2+}$ salt. If a manganese compound is used, it may for example be in the form of a manganese$^{2+}$ salt or a manganese$^{3+}$ salt. If a cobalt compound is used, it may for example be in the form of a cobalt$^{2+}$ salt.

Depending on the reactivity of the transition metal compound, the reactivity of the initiation system may be enhanced using a co-accelerator.

Examples of suitable co-accelerators include 1,3-dioxo-compounds, bases and thiol containing compounds.

The 1,3-dioxo compound is preferably a 1,3-dioxo compound having the following formula:

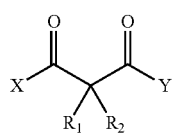

(A)

wherein X, Y=H, $C_1$-$C_{20}$ alkyl, $C_6$-$C_{20}$ aryl, alkylaryl, arylalkyl, part of a resin chain, $OR_3$, $NR_3R_4$; $R_1$, $R_2$, $R_3$, and $R_4$ each individually may represent hydrogen (H), or a $C_1$-$C_{20}$ alkyl, aryl, alkylaryl or arylalkyl group, that each optionally may contain one or more hetero-atoms (e.g. oxygen, phosphor, nitrogen or sulphur atoms) and/or substituents; a ring may be present between $R_1$ and $R_2$, $R_1$ and $R_3$, and/or between $R_2$ and $R_4$; $R_3$ and/or $R_4$ may be part of a polymer chain, may be attached to a polymer chain or may contain a polymerizable group. Preferably, X and/or Y are/is $C_1$-$C_{20}$ alkyl and/or $C_6$-$C_{20}$ aryl. More preferably, X and/or Y are/is a methyl group. Preferably, the 1,3-dioxo compound is acetylacetone. The 1,3-dioxo compound may be a resin or may be polymerizable.

Other examples of 1,3-dioxo compounds include 1,3-diketones, 1,3-dialdehydes, 1,3-ketoaldehydes, 1,3-ketoesters, and 1,3-ketoamides.

Examples of suitable base co-accelerators are organic bases or inorganic bases. Inorganic bases are for example alkali metal or earth alkali metal compounds. The organic base is preferably a nitrogen containing compound, preferably an amine.

Examples of suitable thiol-containing compounds that may be used as a co-accelerator include aliphatic thiols, more preferably primary aliphatic thiols. The aliphatic thiol is preferably an α-mercapto acetate, a α-mercapto propionate, a dodecylmercaptane or a mixture thereof. The thiol-functionality of the thiol-containing compound in the powder coating composition is preferably 2, more preferably 3.

The combination of initiator(s) and optionally inhibitor(s) and/or accelerator(s) optionally in combination with co-accelerator(s) in the initiation system suitable for use in the powder coating composition of the present invention can easily be determined by the person skilled in the art. This can for example be done by using the BDDMA test as described herein and by varying the (amount of) initiator(s), the (amount of) inhibitor(s), the (amount of) accelerator(s) and the (amount of) co-accelerator(s) to find the combinations wherein the geltime as measured using the BDDMA test is between 2.5 and 1000 minutes, for example at least 4 minutes and/or at most 200 minutes.

The resin system as present in the powder coating composition of the present invention comprises a resin and a co-crosslinker.

The resin contains reactive unsaturations in which the reactive unsaturations are carbon carbon double bonds connected directly to an electron withdrawing group. With reactive unsaturations is meant that the carbon carbon double bonds connected directly to an electron withdrawing group are reactive towards radicals generated by a thermal initiator. For the avoidance of doubt, reactive unsaturations do not include aromatic rings.

The weight per unsaturation (WPU) in the resin system is between 100 and 1000 g resin/mole unsaturation as measured using $^1$H-NMR, for example between 100 and 900 g resin/mole unsaturation. The WPU can for example be determined using $^1$H-NMR, for example as described in Journal of Applied Polymer Science, Vol. 23, 1979, pp 25-38, the complete disclosure of which is hereby incorporated by reference, or by the method as described herein in the experimental section. In the method of the experimental section, the weight per unsaturation (WPU) was determined via $^1$H-NMR on a 300 MHz Varian NMR-spectrometer using pyrazine as internal standard, or the WPU was determined theoretically by dividing the Mn by the amount of unsaturations as added during the synthesis of the resin and/or the co-crosslinker.

Examples of suitable resins include polyesters, polyacrylates (=acrylic resins), polyurethanes, epoxy resins, polyamides, polyesteramides, polycarbonates, polyureas etc., as well as mixtures thereof. Preferably the resin is a polyester.

The reactive unsaturations (the carbon carbon double bonds connected directly to an electron withdrawing group) may be present in the backbone of the resin, pendant on the (backbone of the) resin, at the terminus of the resin or at a combination of these locations. Preferably resins having reactive unsaturations based on fumaric acid, maleic acid and/or itaconic acid, more preferably resins having reactive unsaturations based on fumaric acid and/or maleic acid are used in the powder coating composition of the present invention.

Examples of how to introduce the reactive unsaturation in the resin are described below.

Polyesters are generally polycondensation products of polyalcohols and polycarboxylic acids.

Examples of polycarboxylic acids which may be used in the preparation of a polyester include isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid and trimellitic acid. These illustrative acids can be used in their acid form or where available, in the form of their anhydrides, acyl chlorides or lower alkyl esters. Mixtures of acids can also be used. In addition hydroxycarboxylic acids and lactones can be used. Examples include hydroxypivalic acid and ε-caprolactone.

Polyalcohols, in particular diols, can be reacted with the carboxylic acids or their analogues as described above to prepare the polyester. Examples of polyalcohols include aliphatic diols, for example, ethylene glycol, propane-1,2-diol, propane-1,3-diol, butane-1,2-diol, butane-1,4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1,0]decane (=tricyclodecane dimethylol) and 2,3-butenediol.

Trifunctional or more functional alcohols (together: polyols) or acids can be used to obtain branched polyesters. Examples of suitable polyols and polyacids are glycerol, hexanetriol, trimethylolethane, trimethylolpropane, pentaerythritol and trimellitic acid.

Monofunctional acids, for example para-tert-butyl benzoic acid, benzoic acid, metha-toluic acid, cinnamic acid, crotonic acid may be used to block the polymer chain.

Preferably, the resin in the powder coating composition of the present invention is a polyester prepared from at least the following monomers: terephthalic acid, neopentylglycol and/or propylene glycol. For branching trimethylolpropane may be present.

The polyesters can be prepared via customary, generally known polymerization methods by esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of amounts of these esterification catalysts used are usually around 0.1 wt % based on the total weight of the polyester.

The conditions of preparation of the polyester and the COOH/OH ratio can be chosen such that end products are obtained which have an acid value or hydroxyl value which is within the intended range of values.

Preferably, the viscosity of the polyester resin is in the range of from 2 to 30 Pa·s as measured at 160° C. using the method as described herein.

The resin can also be a polyacrylate, also known as acrylic resin. Generally, an acrylic resin is based on alkyl esters of (meth)acrylic acid optionally in combination with styrene. These alkyl esters of (meth)acrylic acid may be replaced by hydroxyl or glycidyl functional (meth)acrylic acids. Examples of alkyl esters of (meth)acrylic acid include, for example ethyl(meth)acrylate, isopropyl(meth)acrylate, n-butyl(meth)acrylate, n-propyl(meth)acrylate, isobutyl (meth)acrylate, ethylhexyl acrylate, cyclohexyl(meth)acrylate and mixtures thereof.

To obtain an acrylic resin having a hydroxyl functionality, the acrylic resin contains a hydroxyl functional (meth) acrylic acid, preferably in combination with alkyl esters of (meth)acrylic acid. Examples of hydroxyl functional (meth) acrylic acid esters include hydroxyethyl(meth)acrylate, and hydroxypropyl(meth)acrylate etc.

To obtain an acrylic resin having a glycidyl functionality, the acrylic resin contains a glycidyl functional (meth)acrylic acid esters, preferably in combination with alkyl esters of (meth)acrylic acid. Examples of glycidyl functional (meth) acrylic acid esters include glycidyl methacrylate, etc.

Clearly, it is also possible to synthesize acrylic resins with both hydroxyl and glycidyl functionality.

Polyurethanes can for example be prepared using customary, generally known polyaddition reaction of a (poly) isocyanate with a (poly)alcohol in the presence of, if needed a catalyst and other additives.

For example, if needed, customary catalysts such as, for example tertiary amines or organometallic compounds, such as for example monobutyltin tris(2-ethylhexanoate), tetrabutyl titanate or dibutyl tin dilaurate can be used. Examples of amounts of these catalysts used are usually around 0.01 wt % based on the total weight of the resin.

Examples of the (poly)alcohols that may be used in the preparation of polyurethanes are the same as those that can be used in the preparation of a polyester.

Examples of isocyanates that may be used in the preparation of polyurethanes include but are not limited to diisocyanates, for example toluene 2,4-diisocyanate, toluene 2,6-diisocyanate, 4,4'-diphenyl methane diisocyanate, 2,4'-diphenyl methane diisocyanate, 2,2'-diphenyl methane diisocyanate, hexamethylene diisocyanate, 5-isocyabato-1-(isocyanatomethy)-1,3,3-trimethylcyclohexane (isophorone diisocyanate), m-tetramethylxylene diisocyanate, dicyclohexylmethane 4,4'-diisocyanate, naphthalene 1,5-diisocyanate or 1,4-diisocyanatobenzene; and triisocyanates, for example triphenylmethane-4,4',4''-triisocyanate.

The resin may also be a polyepoxide, also known as epoxy resin. Epoxy resins may for example be prepared from phenolic compounds in combination with epichlorohydrins resulting in epoxy resins like for example a bisphenol A diglycidyl ether such as is commercially available as Epicote™1001 or a Novolac epoxide.

Polyamides can for example be prepared by a polycondensation reaction of a diamine and a dicarboxylic acid.

The dicarboxylic acids may be branched, non-linear or linear. Examples of suitable dicarboxylic acids are for example phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid.

Examples of suitable aliphatic diamines include for example isophorondiamine, 1,2-ethylenediamine, 1,3-propylenediamine, 1,6-hexamethylenediamine, 1,12-dodecylenediamine, 1,4 cyclohexanebismethylamine, piperazine, p-xylylenediamine and/or m-xylylenediamine. The polyamide may also be branched using branching components. Suitable examples of branching components include amines, for example di-alkylene-triamines, such as for example di-ethylene-triamine or di-hexamethylene-triamine; di-alkylene-tetramines or di-alkylene-pentamines; acids, for example 1,3,5-benzene tricarboxylic acid, trimellitic anhydride or pyromelitic anhydride; and poly-functional amino acids, such as for example aspartic acid or glutamic acid.

Polyester amides are resins containing both esterbonds (as in a polyester) and amide bonds (as in a polyamide) and may for example be prepared from mono-, di-, tri- or polyfunctional monomers, such as monomers with carboxylic acid functionality, monomers with hydroxyl functionality, monomers with amine functionality and/or monomers having a combination of any of these functionalities.

In principle any solid hydroxyl functional polycarbonate may be used. Hydroxyfunctional polycarbonates are commercially available from various sources.

Polyureas can for example be prepared using customary, generally known polyaddition reactions of a (poly)isocyanate with a (poly)amine in the presence of, if needed a catalyst and other additives similar to what is described above for polyurethanes. Suitable (poly)amines for the preparation of polyureas include those as are exemplified above for the polyamides. Suitable (poly)isocyanates for the preparation of polyureas include those as are exemplified above for the polyurethanes.

The reactive unsaturation may be built into the resin backbone, for instance by reacting a hydroxyl functional monomer (such as the polyalcohols mentioned before) with an unsaturated carboxylic acid or anhydride, such as for example fumaric acid, maleic acid, citraconic acid, itaconic acid or mesaconic acid. Resins where it is possible to build reactive unsaturation into the backbone by reacting a hydroxylfunctional monomer with an unsaturated carboxylic acid are for example polyesters.

Also, the reactive unsaturation may be connected to a side-group on the resin, by reacting an epoxide functional pendant group in the resin, for example a glycidyl functional acrylate, with an unsaturated carboxylic acid, such as for example methacrylic acid or acrylic acid or the monoesters of fumaric acid, maleic acid, citraconic acid, itaconic acid or mesaconic acid.

Also, the reactive unsaturation may be connected to a side-group on the resin, by reacting a hydroxyl functional pendant group in the resin, for example a hydroxyl functional acrylate, with an unsaturated carboxylic acid, such as for example methacrylic acid or acrylic acid or an unsaturated carboxylic anhydride, such as for example the anhydrides of itaconic acid, maleic acid or citraconic acid.

It is also possible to connect the reactive unsaturation to the terminus (or termini) of the resin, for example by reacting a hydroxyl functional, epoxide functional or amine functional terminal group with an unsaturated carboxylic acid, such as for example fumaric acid, maleic acid, citraconic acid, itaconic acid, mesaconic acid or the monoesters thereof, methacrylic acid or acrylic acid. So, a resin having a hydroxyl, amine or glycidyl terminal group may be reacted with such carboxylic acids.

Also, or alternatively, hydroxyl or amine functional resins may be modified with hydroxyl functional compounds containing a reactive unsaturation via reaction with a diisocyanate forming urethane and/or urea bonds. This modification may be done both on pendant hydroxyl groups and on terminal hydroxyl groups.

Sometimes also a small amount of inhibitor is present during the esterification to prevent loss of unsaturations due to the possible presence of peroxides in glycols and instability due to the esterification temperatures.

The weight per unsaturation (WPU) of the resin as determined using $^1$H-NMR is usually less than 7500, preferably less than 1500, for example less than 1150 or less than 1100 or less than 1000 g/mole and/or preferably more than 100, more preferably more than 250 g/mole, for example more than 500 g/mole.

In case of an amorphous resin, the glass transition temperature (Tg) of the resin is preferably at least 20° C., more preferably at least 25° C. Preferably, the resin is a polyester having a Tg of at least 40, preferably at least 45° C. and/or a Tg of at most 65° C., preferably at most 60° C., for example at most 55° C., for example at most 50° C.

The amount of acid groups in a resin is determined by the titration of the acid/anhydride groups by KOH. The amount of acid groups is expressed as the acid value (AV) in mg KOH/g resin.

The amount of hydroxyl groups in a resin is determined by the titration of the hydroxyl groups with acetic anhydride and the back titration with KOH. The amount of hydroxyl groups is expressed as the hydroxyl value (OH-value or OHV) in mg KOH used per g resin.

A resin is classified as acid functional in case the hydroxyl value is lower than the acid value. In case a carboxylic functional resin is desired, the hydroxyl value of the resin is usually below 10 mg KOH per g resin.

A resin is classified as hydroxyfunctional in case the acid value is lower than the hydroxyl value. In case a hydroxyl functional resin is desired, the acid value of the resin is usually below 10 mg KOH per g resin.

The hydroxyl value of the resin in the powder coating composition of the present invention is usually in the range of from 0 to 70 mg KOH per g resin.

It is desired to have a resin, preferably a polyester, with an acid value of less than 5 mg KOH per g resin in case a vinylether or vinylester co-crosslinker is used in the powder coating composition of the present invention. In case a co-crosslinker other than a vinylether or a vinylester is used, the acid value of the resin, preferably a polyester may range from 0 to 250, for example from 0 to 60 mg KOH per g of the resin.

The number average molecular weight (Mn) of the resin is in principle not critical and can for example be from 1,000 to 20,000 Da. Preferably, the Mn of the resin is at least 1,500 Da, for example at least 2,000 Da and/or preferably at most 8,000, for example at most 4,000 Da in case of an amorphous resin and/or preferably at most 15,000 Da in case of a crystalline resin. Preferably, the resin is a polyester having a number average molecular weight (Mn) in the range of from 1,500 to 8,000, for example in the range of from 2,100 and 4,000 Da.

In the powder coating composition also a co-crosslinker is present. With co-crosslinker is meant a compound having carbon carbon double bonds which are reactable with the reactive unsaturations (the carbon carbon double bonds directly connected to an electron withdrawing group) in the resin.

The co-crosslinker for use in the composition of the present invention, is chosen from the group of acrylates, methacrylates, vinylesters, vinylethers, vinyl amides, alkyn ethers, alkyn esters, alkyn amides, alkyn amines, propargyl ethers, propargyl esters, itaconates, enamines and mixtures thereof, preferably from the group of vinylethers, vinylesters, (meth)acrylates and mixtures thereof.

An acrylate is a monomer, oligomer or polymer having an acrylate moiety (see formula (1) in Table 1). A methacrylate is a monomer, oligomer or polymer having a methacrylate moiety (see formula (2) in Table 1). Examples of liquid (meth)acrylates include butanediol dimethacrylate hexanedioldiacrylate and hydroxypropylmethacrylate. Examples of other (meth)acrylates are as given herein (see for example the part on a resin modified with (meth)acrylate). Since resins containing unsaturations based on (meth)acrylic acid can homopolymerize, a resin based on (meth)acrylic acid may be used in combination with an oligomer or polymer containing (meth)acrylic acid based unsaturations as a co-crosslinker.

A vinylester is a monomer, oligomer or polymer having a vinylester moiety (see formula (3) in Table 1). Examples of vinylesters include mono functional vinylesters, for example stearic acid vinylester, palmitic acid vinylester, benzoic acid vinylester, lauric acid vinylester, hexanoic acid vinylester, pivalic acid vinylester, oleic acid vinylester, methacrylic acid vinylester, decanoic acid vinylester, bromo acetic acid vinylester, myristic acid vinylester, valeric acid vinylester, nonanoic acid vinylester, heptanoic acid vinylester, phenyl acetic acid vinylester, maleic acid (di)vinylester, undecanoic acid vinylester, iodo acetic acid vinylester, 2-naphthoic acid vinylester, 3-chloro-butyric acid vinylester, 4-chloro-butyric vinylester and 2-chloro-butyric acid vinylester; di functional vinylesters, such as for example adipic acid divinylester, fumaric acid divinylester, sebacic acid divinylester, phthalic acid divinylester and terephthalic acid divinylester; and polyfunctional vinylesters, for example trimellitic acid trivinylester.

A vinylether is a monomer, oligomer or polymer having a vinylether moiety (see formula (4) in Table 1). The co-crosslinker in the powder coating composition of the present invention is for example a vinylether. Examples of liquid vinylethers include mono (alcohol) functionalized vinylethers, for example ethyl vinylether, 4-hydroxybutyl vinylether, 2-hydroxyethyl vinylether, diethylene glycol monovinyl ether or 4-(hydroxy methyl)cyclohexyl methyl vinyl ether (1,4-cyclohexanedimethanol vinyl ether); di alcohol functionalized vinylethers, such as for example butanediol divinylether, diethyleneglycol divinylether, triethyleneglycol divinylether, tetraethyleneglycol divinylether, poly-THF™ 290-divinylether, hexanediol divinylether, 1,4-cyclohexanedimethanol divinylether; tri alcohol functionalized vinylethers, for example trimethylol propane trivinylether, 1,2,4-trivinylcyclohexane; and mono amino functional vinylethers, for example 3-amino propyl vinyl ether.

For example, a vinylether may be prepared from a dimethylester and a hydroxyfunctional vinylether under formation of a vinyletherester.

Examples of amorphous or semi-crystalline vinyl ethers include vinylether urethanes, vinylether polyester urethanes, vinylether ureas and vinylether polyester ureas. The polyester part of a vinylether polyester urethane is generally a polycondensation product of polyalcohols and polycarboxylic acids and may have the same monomers and may be synthesized analogous to the synthesis of polyesters as described above. The polyester part of vinylether polyester urethane may be saturated or unsaturated and may be similar to the resin.

In order to prepare a vinylether urethane, isocyanate may be reacted with a hydroxyfunctional vinylether and/or a polyalcohol. To prepare a vinylether polyester urethane, an isocyanate may be reacted with a hydroxyfunctional vinylether and a hydroxyfunctional polyester (for example a polyester as described above). These reactions are customary, generally known polyaddition reaction of a (poly)isocyanate with a (poly)alcohol in the presence of, if needed, a catalyst and other additives. Some examples of catalysts, other additives, polyalcohols and isocyanates are given herein (see for example the part on polyurethanes).

Examples of vinylethers also include vinyletherpolyesters, which for example can be prepared from acid functional polyesters (for example as exemplified herein) with hydroxyfunctional vinylethers (for example as exemplified herein). Of course, it is also possible to prepare vinyletherpolyesters via transesterification of hydroxyfunctional or alkylfunctional polyesters with hydroxyfunctional vinylethers.

A vinylamide is a monomer, oligomer or polymer having a vinylamide moiety (see formula (5) in Table 1). An alkyn ether is a monomer, oligomer or polymer having an alkyn ether moiety (see formula (6) in Table 1). An alkyn ester is a monomer, oligomer or polymer having an alkyn ester moiety (see formula (7) in Table 1). An alkyn amide is a monomer, oligomer or polymer having an alkyn amide moiety (see formula (8) in Table 1). An alkyn amine is a monomer, oligomer or polymer having an alkyn amine moiety (see formula (9) in Table 1). A propargyl ethers is a monomer, oligomer or polymer having a propargyl ethers moiety (see formula (10) in Table 1). A propargyl ester is a monomer, oligomer or polymer having a propargyl ester moiety (see formula (11) in Table 1).

An itaconate is a monomer, oligomer or polymer having an itaconate moiety (see formula (12) in Table 1). Examples of liquid itaconates include diethylitaconate, dibutylitaconate, etc. Examples of solid itaconates include dimethylitaconate. Examples of amorphous itaconates are as given above (see for example the part on a resin modified with monoesters of itaconic acid or itaconic acid). Since resins containing unsaturations based on itaconic acid can homopolymerize, a resin containing itaconic acid based unsaturations may be used in combination with an oligomer or polymer containing itaconic acid based unsaturations as a co-crosslinker.

An enamine is a monomer, oligomer or polymer having an enamine moiety (see formula (13) in Table 1).

As defined herein, a monomer has an Mn below 500 Da, an oligomer has an Mn below 1,500 Da and a polymer has an Mn of at least 1,500 Da.

TABLE 1

| Structure formula | name |
|---|---|
| (1) | acrylates |
| (2) | methacrylate |
| (3) | vinylester |
| (4) | vinylether |
| (5) | vinyl amide |
| (6) | alkyn ether |
| (7) | alkyn ester |
| (8) | alkyn amide |

TABLE 1-continued

| Structure formula | name |
|---|---|
| (9) | Alkyn amine |
| (10) | propargyl ether |
| (11) | propargyl ester |
| (12) | itaconate |
| (13) | enamine |

The co-crosslinker for use in the composition of the present invention, is chosen from the group of monomers, oligomers or polymers comprising one or more of the following moieties: (meth)acrylate, vinylester, vinylether, vinyl amide, alkyn ether, alkyn ester, alkyn amide, alkyn aminepropargyl ester, propargyl ether, itaconate and/or enamine moieties. The points of attachment of the moieties are indicated with

In case the carbon carbon double bonds directly connected to an electron withdrawing group in the resin are capable of reacting with the resin itself (i.e. the resin is homopolymerizable) as may be the case for some resins containing acrylate, methacrylate or itaconate moieties, the resin and the co-crosslinker may contain the same moieties, and in a special embodiment, the presence of a separate co-crosslinker is therefore optional and the resin and the co-crosslinker may be the same.

In case the resin is incapable of homopolymerization, a separate co-crosslinker needs to be present to obtain curing. For the avoidance of doubt, within the framework of the invention, a resin can homopolymerize if the reactive unsaturations in the resins are able to react with each other after radical initiation by the radical initiator.

The separate co-crosslinker may be (semi-)crystalline or amorphous. Also, a liquid co-crosslinker may be used. Preferably, the co-crosslinker is non-volatile at the temperatures and pressures used when processing, applying and storing the powder coating composition.

The weight per unsaturation of the co-crosslinker as determined using $^1$H NMR is preferably lower than 870 g/mole, for example lower than 650 g/mole, for example lower than 630 g/mole and/or preferably higher than 70, more preferably higher than 100, for example higher than 150 g/mole. The Mn of the co-crosslinker is not critical and may vary between wide ranges, for example the Mn may be between 100 and 20,000 Da.

The amount of co-crosslinker used in the powder coating composition is in principle not critical, especially if a homopolymerizable resin is used. In case the resin is not capable of homopolymerization, for example, the molar ratio of the unsaturations in the co-crosslinker and the unsaturations in the resin may be between 9:1 and 1:9, preferably between 2:1 and 1:2. Preferably, in this case, about equimolar amounts of unsaturations in the co-crosslinker and resin are used.

The amount of initiation system used is such that when the powder coating composition of the invention is applied to a substrate and cured at a temperature of 130° C. for 20 minutes, the resulting coating resists at least 50, preferably at least 70 acetone double rubs. A method for measuring the acetone double rubs is described herein.

In one embodiment of the invention, such powder coating composition has a curing reaction enthalpy peak at most 60 minutes at 120° C. and at least 2.5 minutes at 60° C. after the start of an isothermal DSC. The method for performing the isothermal DSC measurement is described herein.

Alternatively, the amount of initiation system to be used in the powder coating of the present invention is chosen such that the curing reaction enthalpy peak of the powder coating composition is at most 60 minutes at 120° C. and at least 2.5 minutes at 60° C. after the start of an isothermal DSC. In another embodiment of the invention, a coating prepared from such powder coating composition resists at least 50, preferably 70 acetone double rubs.

Preferably, the curing reaction enthalpy peak is at least 4, more preferably at least 6 minutes at 60° C. and/or at most 45 minutes at 120° C.

With isothermal DSC is meant that a thermal analysis measurement is performed using a differential scanning calorimeter at a constant temperature. The used DSC is for example a DSC Q2000 apparatus from TA Instruments. A powder coating composition sample of approximately 5-10 mg is used. The sample is first stabilized at room temperature (2 minutes), then heated with 5° C./min or 20° C./min to respectively 60° C. or 120° C. and kept constant at these temperatures for a certain period.

For quick screening of the powder coating composition—especially for (very) reactive peroxides—the powder coating composition sample used for the DSC measurements is prepared as follows: A 20% solution of the resin system (resin and co-crosslinker) and initiation system is prepared in a mixture of dichloromethane and ethanol (ratio 3:2). The ratio resin:co-crosslinker is 1:1 on mole unsaturation. A film of the solution of the powder coating composition having a thickness 150 μm is applied on a glass panel with a doctor-blade. The film is dried overnight. The dried film is scraped from the glass panel and isothermal DSC measurements were performed with the obtained material.

The preparation of powder coating compositions is described by Misev in "Powder Coatings, Chemistry and Technology" (pp. 224-300; 1991, John Wiley) hereby incorporated by reference.

A common way to prepare a powder coating composition is to mix the separately weighed-out components in a premixer, heat the obtained premix, for example in a kneader, preferably in an extruder to obtain an extrudate, cool down the obtained extrudate until it solidifies and crush it into granules or flakes that are further grinded to reduce the particle size followed by appropriate classification to obtain a powder coating composition of the right particle size. Therefore, the invention also relates to a process for the preparation of a powder coating composition according to the invention comprising the steps of:
  a. mixing the components of the powder coating composition to obtain a premix
  b. heating the obtained premix, preferably in an extruder, to obtain an extrudate
  c. cooling down the obtained extrudate to obtain a solidified extrudate and
  d. breaking the obtained solidified extrudate into smaller particles to obtain the powder coating composition.

Preferably, the premix is heated to a temperature at least 5° C., more preferably at least 10° C. below the temperature at which it is intended to cure the powder coating composition. If the premix is heated in an extruder, it is preferred to use a temperature control in order to avoid too high temperatures that could lead to curing of the powder coating composition in the extruder.

In another aspect, the invention relates to a process for coating a substrate comprising the following steps:
  1) applying a powder coating composition according to the invention to a substrate such that the substrate is partially or fully coated with a coating.
  2) heating the obtained partially or fully coated substrate for such time and to such temperature such that the coating is at least partially cured.

The powder coating composition of the present invention may be applied using the techniques known to the person skilled in the art, for example using electrostatic spray or electrostatic fluidized bed.

Heating of the coated substrate may be done using conventional methods, such as with a convection oven and/or with an (N)IR lamp. Even microwave equipment may be used to heat the substrate.

The time during which the coating is at least partially cured is preferably below 60 minutes and usually above 1 minute in case a convection oven is used to heat the coating. More preferably, the curing time is below 40 minutes in case a convection oven is used to heat the coating.

The temperature at which the coating is cured is preferably below 130° C. and usually above 60° C. Preferably, the curing temperature is lower than 120° C., more preferably lower than 110° C., most preferably lower than 100° C., most preferably lower than 95° C. Preferably, the curing temperature is at least 65° C., more preferably 70° C., even more preferably at least 75° C.

The powder coating composition of the present invention may optionally contain the usual additives, such as for example fillers/pigments, degassing agents, flow agents, or (light) stabilizers. It should be noted that none of these usual additives are considered to be transition metal compounds. Examples of flow agents include Byk™ 361 N. Examples of suitable fillers/pigments include metal oxides, silicates, carbonates or sulphates. Examples of suitable stabilizers include UV stabilizers, such as for example phosphonites, thioethers or HALS (hindered amine light stabilizers). Examples of degassing agents include benzoin and cyclohexane dimethanol bisbenzoate. Other additives, such as additives for improving tribo-chargeability may also be added.

In a special embodiment of the invention the powder coating composition of the present invention comprises a resin, preferably a polyester, for example a polyester based on fumaric acid, comprises a co-crosslinker, for example a vinylether, for example the vinylether as commercially available such as Uracross™ P3307 from DSM Resins and a thermal initiator, for example a perdicarbonate, for example di(4-t-butylcyclohexyl)peroxydicarbonate or dimyristyl peroxydicarbonate which are commercially available from AkzoNobel under the names Perkadox™ 16 and Perkadox™ 26, respectively and an inhibitor, for example a hydroquinone, for example tert-butylhydroquinone or 2,3,5-trimethyl hydroquinone.

The invention therefore especially relates to a powder coating composition according to the present invention, wherein the resin is a polyester based on fumaric acid, wherein the co-crosslinker is a vinylether and wherein the thermal initiation system comprises a perdicarbonate, preferably di(4-t-butylcyclohexyl)peroxydicarbonate or dimyristyl peroxydicarbonate and a hydroquinone, preferably tert-butylhydroquinone or 2,3,5-trimethylhydroquinone.

In a special embodiment of the invention, the powder coating composition of the present invention comprises a resin, preferably a polyester, for example a polyester based on fumaric acid, a co-crosslinker, for example a vinylether, for example the vinylether as commercially available such as Uracross™ P3307 from DSM Resins and a thermal initiator, for example benzoyl peroxide (BPO).

The invention therefore especially relates to a powder coating composition according to the present invention, wherein the resin is a polyester based on fumaric acid, wherein the co-crosslinker is a vinylether and wherein the thermal initiator is benzoyl peroxide.

In another aspect, the invention relates to a substrate that is fully or partially coated with a powder coating based on the heat-curable powder coating composition according to the present invention.

In one embodiment of the invention the substrate is a non heat-sensitive substrate, for example glass, ceramic, fibre cement board, or metal, for example aluminum, copper or steel. In another embodiment of the invention, the substrate is a heat-sensitive substrate. Therefore, the invention also relates to use of a powder coating composition of the invention to coat a heat-sensitive substrate, preferably wood.

Heat-sensitive substrates include plastic substrates, wood substrates, for example solid wood, such as for example: hard wood, soft wood, plywood; veneer, particle board, low density fibre board, medium density fibreboard and high density fibreboard, OSB (Oriented Strand Board) wood laminates, chipboard and other substrate in which wood is a important constituent, such as for example foil covered wooden substrates, engineered wood, plastic modified wood, plastic substrates or wood plastic compounds (WPC); substrates with cellulosic fibres, for example cardboard or paper substrates; textile and leather substrates.

Other heat-sensitive substrates include objects that are a combination of a metal substrate with a heat-sensitive part, such as plastic hosing, heavy metal parts, strips, for example aluminium frames with heat strips etc.

Examples of plastic substrates include unsaturated polyester based compositions, ABS (acrylonitril butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethyleneterephthalate and nylon, for example polyamide 6,6 and combinations thereof, for example polycarbonate-ABS.

Other substrates that are particularly suitable for coating with the powder coating of the invention are those where a low temperature cure is desired for efficient production, such as heavy metal parts.

In another aspect, the invention relates to the use of a composition according to the invention to fully or partially coat a substrate.

Also, the invention relates to the use of a powder coating composition according to the invention as a stain, primer or topcoat layer.

Specific wood coating markets where the powder coating composition of the invention may be used include domestic furniture, such as tables, chairs, cabinets, etc., bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and wooden flooring.

Specific plastic coating markets where the powder coating composition of the invention may be used include automotive applications, such as interior car parts, wheel covers, bumpers, under the hood parts etc, flexible flooring, sporting goods, cosmetics, audio-visual applications, such as TV sets, computer housing, phones, etc., household appliances and satellite dishes.

EXAMPLES

The invention is explained in more detail with reference to the following non-limiting examples.

Experimental Section

Determination of Reactivity of Initiation Systems in Butane Diol-Dimethacrylate (BDDMA)

The determination of reactivity of the initiating systems was performed by monitoring the curing of BDDMA by means of standard gel time equipment. The gel time ($T_{gel}$ or $T_{60->70°\,C.}$) was determined by measuring the exothermic reaction according to the method of DIN 16945 section 6.2.2.2 when curing BDDMA at 60° C. with 1% of the initiation systems as indicated in table 2. The equipment used therefore was a Soform gel timer, with a Peakpro software package and National Instruments hardware; the water bath and thermostat used were respectively Haake W26, and Haake DL30.

In table 2, the amount of transition metal compound (the accelerator) is indicated in mmol transition metal compound per kg BDDMA.

TABLE 2

| Entry | Initiation system | Gel time (min) |
|---|---|---|
| 1 | Azo-bis-isobutyronitril (AIBN) | 31 |
| 2 | Di(4-t-butyl cyclohexyl) peroxy dicarbonate (Perkadox ™ 16) | 5.8 |
| 3 | Dicetyl peroxy dicarbonate (Perkadox ™ 24) | 7 |
| 4 | Dimyristyl peroxy dicarbonate (Perkadox ™ 26) | 4.3 |
| 5 | Di decanoyl peroxide (Perkadox ™ SE-10) | 67 |
| 6 | Dilauroyl peroxide (Laurox ™ S) | 90 |
| 7 | Dibenzoyl peroxide (Luperox ™ A98) | 101 |
| 8 | t-Amyl peroxy pivalate (Trigonox ™ 125) | 13 |
| 9 | t-Butyl peroxy neoheptanoate (Trigonox ™ 257) | 11 |
| 10 | Lauroyl peroxide (Luperox ™ LP) | 82 |
| 11 | t-Butyl peroxy 2-ethylhexanoate (Trigonox ™ 21) | 131 |
| 12 | Di-iso-butyrylperoxide (Trigonox ™ 187-W26) | <0.4 |
| 13 | Cumyl peroxyneodecanoate (Trigonox ™ 99-C75) | 2 |
| 14 | 1,1,3,3-Tetramethyl butyl peroxyneodecanoate (Trigonox ™ 423-C70) | 2.2 |
| 15 | 1,1-Di-(t-butylperoxy)-3,3,5-trimethylcyclohexane (Trigonox ™ 29 40B-GR) | >1440 |
| 16 | 3,6,9-Triethyl-3,6,9-trimethyl triperoxonane (Trigonox ™ 310) | >1440 |
| 17 | Di(t-butylperoxy isopropyl)benzene (Perkadox ™ 14S) | >1440 |
| 18 | 2,3-Dimethyl-2,3-diphenylbutane (Perkadox ™ 30) | >1440 |
| 19 | Di-t-butylperoxide | >1440 |
| 20 | Cumylhydroperoxide | >1440 |
| 21 | Dicumylperoxide (Perkadox ™ BC-FF) | >1440 |
| 22 | t-Butyl perbenzoate (Trigonox ™ C) | >1440 |
| 23 | 2,5-Dimethyl-2,5-di(t-butylperoxy)hexane | >1440 |
| 24 | Methylethylketone peroxide solution (Butanox ™ M50) | >1440 |
| 25 | Acetylacetone peroxide solution (Trigonox ™ 44B) | >1440 |
| 26 | Cyclohexanone peroxide solution (Cyclonox ™ LE50) | 1105 |
| 27 | Dilauroylperoxide/N,N-diisopropanol-p-toluidine (equimolar amounts) | 4.8 |
| 28 | Dibenzoylperoxide/N-phenyldiethanolamine (equimolar amounts) | 4.0 |
| 29 | Dibenzoylperoxide/N,N-dimethyl-p-toluidine (equimolar amounts) | 0.4 |
| 30 | t-Butyl perbenzoate/Cu (1.0 mmol/kg) | 11 |
| 31 | Methylethylketone peroxide solution/Co (1.0 mmol/kg) | 5 |
| 32 | t-Butyl perbenzoate/Co (6.0 mmol/kg | 5.2 |
| 33 | Dicumylperoxide/Mn (3.0 mmol/kg)/pentaerythritoltetramercaptopropionate (1.3 mmol/kg) | 41 |
| 34 | Di(4-t-butyl cyclohexyl) peroxy dicarbonate/methylhydroquinone (250 ppm) | 9.2 |
| 35 | Di(4-t-butyl cyclohexyl) peroxy dicarbonate/methylhydroquinone (2000 ppm) | 11.9 |
| 36 | Dicetyl peroxy dicarbonate/methylhydroquione (500 ppm) | 10.1 |
| 37 | Dimyristyl peroxy dicarbonate/methylhydroquinone (250 ppm) | 6.8 |
| 38 | Dimyristyl peroxy dicarbonate/methylhydroquinone (2000 ppm) | 8.6 |
| 39 | t-Butyl perbenzoate/Co (6.0 mmol/kg)/t-butylhydroquinone (500 ppm) | 11.6 |
| 40 | t-Butyl perbenzoate/Co (12.0 mmol/kg)/t-butylhydroquinone (500 ppm) | 7.9 |
| 41 | t-Butyl peroxy 2-ethylhexanoate/Co (3.0 mmol/kg) | 3.8 |

TABLE 2-continued

| Entry | Initiation system | Gel time (min) |
|---|---|---|
| 42 | t-Butyl peroxy 2-ethylhexanoate/Cu (3.0 mmol/kg) | 16.6 |
| 43 | t-Butyl peroxy-2-ethylhexyl carbonate (Trigonox ™ 117) | >1440 |
| 44 | t-Butyl peroxy-2-ethylhexyl carbonate/Co (3.0 mmol/kg) | 28.3 |
| 45 | t-Butyl peroxy-2-ethylhexyl carbonate/Cu (3.0 mmol/kg) | 18.7 |
| 46 | t-Amyl peroxy-2-ethylhexanoate (Trigonox ™ 121) | 88.6 |
| 47 | t-Amyl peroxy-2-ethylhexanoate/Co (3.0 mmol/kg) | 2.8 |
| 48 | t-Amyl peroxy-2-ethylhexanoate/Cu (3.0 mmol/kg) | 13.2 |
| 49 | 1,1-Di-(t-butylperoxy)-3,3,5-trimethylcyclohexane/Co (3.0 mmol/kg) | >1440 |
| 50 | 1,1-Di-(t-butylperoxy)-3,3,5-trimethylcyclohexane/Co (6.0 mmol/kg) | 1213 |

This table clearly shows that multiple peroxides are suitable initiator systems according to the invention. Furthermore this table demonstrates that various relatively unreactive peroxides can be made more reactive with accelerators to gain reactivity in line with the invention (see for example entry 22 vs. entry 30). Furthermore this table shows that various reactive peroxides can be made less reactive with inhibitors in order to obtain a more suitable reactivity (see for example entry 4 vs. entry 38. Furthermore this table also shows that combinations of accelerators and inhibitors can be used for changing the reactivity (entry 39).

Synthesis and Application of the Powder Coating

TABLE 3

Chemicals

| Chemical name | Commercial name | Description or use |
|---|---|---|
| Propylene glycol | | Monomer |
| Neopentyl glycol | | Monomer |
| Trimethylol propane | | Monomer |
| Hydrogenated bis-phenol A | | Monomer |
| Terephthalic acid | | Monomer |
| Isophthalic acid | | Monomer |
| Benzoic acid | | Monomer |
| Fumaric acid | | Monomer |
| Hydroxylbutyl vinylether | | Monomer |
| Isophoronediisocyanate | | Monomer |
| Ethylene carbonate | | |
| 2,3-epoxy propyl neodecanoate | | |
| Bis-(4-vinyl oxy butyl) hexamethylenediurethane | URACROSS ™ P3307 from DSM | Co-crosslinker |
| Di(4-tert-butylcyclohexyl) peroxy dicarbonate | Perkadox ™ 16 from Akzo Nobel | Initiator |
| Dimyristyl peroxy dicarbonate | Perkadox ™ 26 from Akzo Nobel | Initiator |
| Dilauroyl peroxide | Laurox ™ S from Akzo Nobel | Initiator |
| Dibenzoyl peroxide (BPO) | Luperox ™ A75 from Arkema | Initiator |
| Tert-butyl peroxybenzoate | Trigonox ™ C from Akzo Nobel | Initiator |
| Di-iso-butyrylperoxide | Trigonox ™ 187-W26 from AkzoNobel | Initiator |
| Cumyl peroxyneodecanoate | Trigonox ™ 99-C75 from AkzoNobel | Initiator |
| 1,1,3,3-tetramethyl butyl peroxyneodecanoate | Trigonox ™ 423-C70 from AkzoNobel | Initiator |
| Tert-butyl hydroquinone | | Inhibitor |
| 2,3,5-trimethyl hydroquinone | | Inhibitor |
| Cobalt Octoate (Co), also known as Cobalt bis(2-ethylhexanoate) | COMMET Cobalt Octoate from De Monchy International B.V. | Accelerator |
| Titanium dioxide pigment | Kronos ™ 2310 from Kronos | Pigment |
| | Byk ™-361 N from Byk | Flow agent |

Synthesis of Resins: General Procedure

The chemicals used in the following examples are described in table 3.

Resin Synthesis (Resin B)

A reaction vessel fitted with a thermometer, a stirrer and a distillation device, was filled with a tin catalyst and the monomers for the first step (all the (poly)alcohols and terephthalic acid) as listed in table 4. Stirring was then applied and a light nitrogen flow was passed over the reaction mixture while the temperature was raised to 230° C. Subsequently, for the second step benzoic acid was added at a temperature of 140° C. followed by esterification at 230° C. When an acid value of less than approximately 8 mg KOH/g resin was reached, the reaction mixture was cooled to 160° C. Fumaric acid together with a small amount of radical inhibitor was added and esterified by increasing the temperature to 200° C. The final stage of the polyester preparation was carried out under reduced pressure.

Resin Synthesis (Resin C, D, E, K)

A reaction vessel fitted with a thermometer, a stirrer and a distillation device, was filled with a tin catalyst and the monomers for the first step (all the (poly)alcohols and terephthalic acid) as listed in table 4. Stirring was then applied and a light nitrogen flow was passed over the reaction mixture while the temperature was raised to 220° C. Subsequently, for the second step benzoic acid, fumaric acid together with a small amount of a radical inhibitor was added at a temperature of 160° C. followed by esterification at 210° C. Esterification was followed by a step under reduced pressure to reach an acid value of approximately 5 mg KOH/g resin. The acid value of the resin was brought below 5 mg KOH/g resin via reaction of the remaining acid-groups of the resin with an epoxy or an alkylene carbonate group (see table 4 which chemical is used). The used amount was dependent on the acid value before addition.

Resin Synthesis (Resin A, G, H, J)

A reaction vessel fitted with a thermometer, a stirrer and a distillation device, was filled with a tin catalyst and the monomers for the first step (all the (poly)alcohols and terephthalic acid) as listed in table 4. Stirring was then applied and a light nitrogen flow was passed over the reaction mixture while the temperature was raised to 220° C. Subsequently, for the second step fumaric acid together with a small amount of radical inhibitor was added at a temperature of 180° C. followed by esterification at 220° C. When an acid value of less than approximately 15 mg KOH/g resin was reached, the reaction mixture was cooled to 205° C. The third stage of the polyester preparation was carried out under reduced pressure till an acid value approximately 5 mg KOH/g resin was reached. The acid value of the resin was brought below 5 mg KOH/g resin via reaction of the remaining acid-groups of the resin with an epoxy or an alkylene carbonate group (see table 4 which chemical is used). The used amount was dependent on the acid value before addition.

Resin Synthesis (Resin F)

A reaction vessel fitted with a thermometer, a stirrer and a distillation device, was filled with a tin catalyst and the monomers for the first step (all the (poly)alcohols and terephthalic acid) as listed in table 3. Stirring was then applied and a light nitrogen flow was passed over the reaction mixture while the temperature was raised to 230° C. When an acid value of less than approximately 10 mg KOH/g resin was reached, the reaction mixture was cooled to 160° C. Itaconic acid together with a small amount of radical inhibitor was added and esterified by increasing the temperature to 220° C. The final stage of the polyester preparation was carried out under reduced pressure.

Resin and Co-Crosslinker Analysis:

Glass transition temperature (Tg) measurements (inflection point) and melting temperature measurements were carried out via differential scanning calorimetry (DSC) on a Mettler Toledo, TA DSC821, in $N_2$ atmosphere and at a heating rate of 5° C./min. Viscosity measurements were carried out at 160° C., on a Rheometric Scientific CT 5 (Rm 265) apparatus (Mettler Toledo). A 30 mm spindle was used. The applied shear-rate was 70 $s^{-1}$. The acid and hydroxyl values of the resins were determined titrimetrically according to ISO 2114-2000 and ISO 4629-1978, respectively.

The weight per unsaturation (WPU) was determined via $^1$H-NMR on a 300 MHz Varian NMR-spectrometer using pyrazine as internal standard. Recorded spectra were analyzed in full with ACD software and peak areas of all peaks were calculated.

The weight resin per mole unsaturation was calculated with the following formula:

$$WPU = \left[ \frac{W_{pyr}}{W_{resin}} \frac{1}{MW_{pyr}} \frac{A_{c=c}/N_{c=c}}{A_{pyr}/N_{pyr}} \right]^{-1}$$

$W_{pyr}$ and $W_{resin}$ are weights pyrazine (is internal standard) and resin, respectively, expressed in the same units. $MW_{pyr}$ is molecular weight pyrazine (=80 gr/mole). $A_{C=C}$ is the peak area for hydrogens attached to the carbon carbon double bonds of the reactive unsaturations (C=C component) in the resin; $N_{C=C}$ is the number of hydrogens of that particular C=C component. $A_{pyr}$ is the peak area for pyrazine and $N_{pyr}$ is the number of hydrogens (=4).

TABLE 4

Synthesis and properties of the resins used

| Monomers | A Amount (mole %) | B Amount (mole %) | C Amount (mole %) | D Amount (mole %) | E Amount (mole %) | F Amount (mole %) | G Amount (mole %) | H Amount (mole %) | J Amount (mole %) | K Amount (mole %) |
|---|---|---|---|---|---|---|---|---|---|---|
| Propylene glycol |  | 46.6 | 46.6 | 46.6 | 46.6 |  |  |  | 48.2 | 46.6 |
| Neopentylglycol | 52.1 |  |  |  |  | 48.9 | 52.1 | 47.9 |  |  |
| Trimethylol propane |  | 1.4 | 1.4 | 1.4 | 1.4 | 3.7 |  | 3.7 | 3.4 | 1.4 |
| Benzoic acid |  | 7.6 | 7.6 | 7.6 | 7.6 |  |  |  |  | 7.6 |
| Terephthalic acid | 26.7 | 25.4 | 25.4 | 25.4 | 25.4 | 24.7 | 36.9 | 37.5 | 38.5 | 34.5 |
| Fumaric acid | 21.3 | 19.0 | 19.0 | 19.0 | 19.0 |  | 11.1 | 10.9 | 9.9 | 9.9 |
| Itaconic acid |  |  |  |  |  | 22.7 |  |  |  |  |
| Ethylene carbonate | X |  | X | X | X |  | X | X |  | X |
| 2,3-epoxy propyl neodecanoate |  |  |  |  |  |  |  |  | X |  |
| Resin characterization |  |  |  |  |  |  |  |  |  |  |
| Weight per unsaturation (WPU) (theoretical) | 502 | 493 | 493 | 493 | 493 | 481 | 1008 | 1028 | 999 | 995 |
| Weight per unsaturation (WPU) (measured with NMR) | 518 | 530 | 537 | 554 | 654 | 758 | 995 | 1130 | 1170 | 1061 |
| Mn (theoretical) | 2134 | 2203 | 2203 | 2203 | 2203 | 2144 | 2225 | 2723 | 2521 | 2294 |
| Hydroxyl value (mg KOH/g) | 44.9 | 12.8 | 17.7 | 18.7 | 20.2 | 68.0 | 38.5 | 42.7 | 53.2 | 17.2 |
| Acid value (mg KOH/g) | 1.2 | 6.5 | 1.8 | 2.3 | 3.0 | 3.1 | 1.5 | 3.1 | 1.5 | 1.6 |
| Tg (° C.) | 38.4 | 43.2 | 39.2 | 38.0 | 38.1 | 24.2 | 49.6 | 46.5 | 51.9 | 47.3 |
| Viscosity at 160° C. (Pa · s) | 5.1 | 4.0 | 5.3 | 3.0 | 2.5 | 3.2 | 12.7 | 21.2 | 33.3 | 4.6 |

Synthesis of Vinyl Ether Based Co Crosslinkers: General Procedure
Method to Determine Presence of Free-NCO.

An FT-IR spectra was recorded on a Varian Excalibur apparatus equipped with an ATR (Golden Gate) accessories. A characteristic peak for free NCO can be found at 2250 cm$^{-1}$. Presence of a peak at this position refers to free NCO groups.

Co-Crosslinker Synthesis (II)

A reaction vessel fitted with a thermometer and a stirrer, was filled with an isocyanate as listed in table 5. Stirring was then applied and a light nitrogen flow was passed over the reaction mixture while the temperature was kept below 15° C. Subsequently, a vinylether as listed in table 5 was dosed such that the reaction mixture was kept below 15° C. during addition. After all vinylether was dosed, the temperature was raised to 65° C. and a tin catalyst was added. The alcohol as listed in table 5 was dosed while the temperature was kept below 75° C. After all alcohol was dosed the temperature was set at 105° C. and maintained at this temperature for approximately half an hour. Next, n-butanol was added until all free NCO had reacted (measured using FT-IR as described above). The temperature was raised to 115° C. and vacuum (0.1 bar) was applied to remove all volatiles. After vacuum the content of the vessel was discharged.

Co-Crosslinker Synthesis (III/IV/V)

A reaction vessel fitted with a thermometer, a stirrer and a distillation device, was filled with a tin catalyst and the monomers for the first step (all the (poly)alcohols, terephthalic or isophthalic acid) as listed in table 5. Stirring was then applied and a light nitrogen flow was passed over the reaction mixture while the temperature was raised to 220° C. Subsequently, for the second step a vinylether and a tin catalyst as listed in table 5 were added at a temperature of 100° C. Subsequently, an isocyanate as listed in table 5 was dosed such that the reaction mixture was kept below 100° C. during addition. After all isocyanate was dosed, the temperature was kept or set at 105° C. and maintained at this temperature for approximately half an hour. Next, n-butanol was added until all free NCO had reacted (measured using FT-IR as described above). The temperature was raised to 115° C. and vacuum (0.1 bar) was applied to remove all volatiles. After vacuum the content of the vessel was discharged.

TABLE 5

| | Synthesis and properties of the co-crosslinker | | | | |
|---|---|---|---|---|---|
| | Co-crosslinker | | | | |
| | I | II | III | IV | V |
| | Type | | | | |
| | Vinylether urethane Amount (mole %) | Vinylether urethane Amount (mole %) | Vinylether urethane Amount (mole %) | Vinylether urethane Amount (mole %) | Vinylether urethane Amount (mole %) |
| Hydroxyl butyl vinyl ether | | 42.9 | 28.4 | 28.5 | 22.0 |
| Isophorone diisocyanate | | 42.9 | 28.4 | 28.5 | 22.0 |
| Hydrogenated bisphenol A | | | | 14.3 | |
| Neopentylglycol | | | 28.7 | 14.3 | 33.6 |
| Trimethylol propane | | 14.3 | | | |
| Terephthalic acid | | | 14.4 | | 22.4 |
| Isophthalic acid | | | | 14.3 | |
| Commercially available from DSM Resins | URACROSS™ P3307 | | | | |
| Co-crosslinker characterization | | | | | |
| Mn (theoretical) | 400 | 1149 | 1009 | 1152 | 1272 |
| Weight per unsaturation in g/mole (WPU) (theoretical) | 204 | 383 | 504 | 576 | 630 |
| Weight per unsaturation in g/mole (WPU) as measured using 1H NMR | 210 | 386 | 532 | 623 | 870 |
| Phase | Crystalline | Amorphous | Amorphous | Amorphous | Amorphous |
| Tm or Tg (° C.) | Tm = 90° C. | Tg = 30° C. | Tg = 24° C. | Tg = 41° C. | Tg = 36° C. |
| Hydroxyl value (mg KOH/g) | n.d. | 6.4 | 9.0 | 1.0 | 1.3 |

TABLE 5-continued

Synthesis and properties of the co-crosslinker

| | Co-crosslinker | | | | |
|---|---|---|---|---|---|
| | I | II | III | IV | V |
| | | | Type | | |
| | Vinylether urethane Amount (mole %) | Vinylether urethane Amount (mole %) | Vinylether urethane Amount (mole %) | Vinylether urethane Amount (mole %) | Vinylether urethane Amount (mole %) |
| Acid value (mg KOH/g) | n.d. | 0.4 | 1.0 | 0.5 | 0.1 |
| Viscosity at 160° C. (Pa · s) | n.d. | 1.2 | 0.8 | 3.9 | 1.8 |

Preparation of the Powder Coating Composition, Application and Analysis:

The compositions of the tested powder coating composition are given in the tables below. The components were extruded at 60° C. using a Prism Twin Screw extruder (200 rpm, torque >90%). The extrudate was grinded and sieved; the sieving fractions smaller than 90 microns were used as a powder coating composition. The powder coating compositions were applied with a corona powder application spray gun on an aluminum ALQ panel and cured at various temperatures for 20 minutes in a convection oven (Heraeus UT 6120). The applied coating layer thickness was approximately 60 μm.

Acetone Double Rubs

Acetone double rubs (ADR) were carried out as described herein to determine the curing.

Preparation of the Powder Coating Composition

The ratio resin: co-crosslinker is chosen 1:1 on mole unsaturation. The amount of initiator in the initiation is based on the total weight of the resin system (e.g. x mole initiator per kg resin system; the resin system for purposes of the amount of initiator and inhibitor is defined as the resin containing the reactive unsaturations plus the co-crosslinker, excluding the usual powder coating composition additives like pigments, fillers, etc.). The amount of inhibitor in the initiation system is based on the total weight of the resin system. The amount of accelerator in the initiation system is based on the total weight of the resin system (e.g. x mole accelerator per kg resin system). The amount of flow agent and pigment is calculated in wt % of the total powder coating composition. In all powder coating compositions, 0.8 wt % of flow agent is used, unless indicated differently.

Example 1

TABLE 6

Influence of the choice of initiation system on the processing in the extruder and on the cure of the powder coating composition.

| | Exp-# | | | | | | |
|---|---|---|---|---|---|---|---|
| | 1.1 | 1.2 | 1.3 | comparative example 1.1 | comparative example 1.2 | comparative example 1.3 | comparative example 1.4 |
| Resin | B | D | C | C | C | C | C |
| Co-crosslinker | I | I | I | I | I | I | I |
| Initiation system | | | | | | | |
| Initiator | Perkadox ™ 26 88.3 mmol/kg | Laurox ™ S 88.3 mmol/kg | Trigonox ™ C 88.3 mmol/kg | Trigonox ™ 187 88.3 mmol/kg | Trigonox ™ 99 88.3 mmol/kg | Trigonox ™ 423 88.3 mmol/kg | Trigonox ™ C 88.3 mmol/kg |
| Inhibitor | Tert-butyl hydroquinone 250 ppm | | Tert-butyl hydroquinone 500 ppm | | | | |
| Accelerator | | | Co 6 mmol/kg | | | | |
| Extrusion | Ok | Ok | Ok | Gel | Gel | Gel | Ok |
| $T_{>50\ ADR}$ (° C.) | 70 | 80 | 70 | | | | 150 |
| $T_{>70\ ADR}$ (° C.) | 80 | 90 | 70 | | | | 160 |
| Reactivity initiation system in BDDMA (min) | 6.3 | 90 | 11.6 | <0.4 | 2 | 2.2 | >1440 |

As can be seen from table 6, the initiation systems that showed a reactivity in BDDMA as measured with the BDDMA test as described herein is from 2.5 to 1000 min can be used as initiation systems to cure a powder coating composition.

It is also shown that by the selection of the initiation system within the reactivity ranges as claimed, the powder coating composition can be cured to an acceptable level at relatively low temperatures, that is $T_{\geq 50}$ ADR (the curing temperature necessary to obtain at least 50 ADR for the coating) is below 130° C. Also, the $T_{\geq 70}$ ADR (the curing temperature necessary to obtain at least 70 ADR for the coating) is below 130° C.

Example 2

Different Initiation Systems

TABLE 7

Different initiation systems.

| | Exp-# | | | | | | | | |
|---|---|---|---|---|---|---|---|---|---|
| | 2.1 | 2.2 | 2.3 | 2.4 | 2.5 | 2.6 | 2.7 | 2.8 | 2.9 |
| Resin | B | B | B | D | E | E | G | G | G |
| Co-crosslinker | I | I | I | I | I | I | I | I | I |
| Initiation system | | | | | | | | | |
| Initiator | Perk. 26 82.0 mmol/kg | Perk. 16 82.0 mmol/kg | BPO 82.0 mmol/kg | Laurox ™ S 82.0 mmol/kg | Perk. 16 82.0 mmol/kg | BPO 82.0 mmol/kg | BPO 82.0 mmol/kg | Perk. 26 82.0 mmol/kg | Perk. 26 82.0 mmol/kg |
| Inhibitor | Tert-butyl hydroquinone 250 ppm | 2,3,5-trimethyl hydroquinone 250 ppm | — | — | 2,3,5-trimethyl hydroquinone 250 ppm | — | — | Tert-butyl hydroquinone 250 ppm | Tert-butyl hydroquinone 500 ppm |
| Accelerator | — | — | — | — | — | — | — | — | — |
| $T_{>50\ ADR}$ (° C.) | 70 | 75 | 90 | 80 | 75 | 90 | 80 | 80 | 90 |
| $T_{>70\ ADR}$ (° C.) | 80 | 80 | 100 | 90 | 80 | 100 | 90 | 90 | 100 |
| Reactivity initiation system in BDDMA (min) | 6.3 | 7.7 | 101 | 90 | 7.7 | 101 | 101 | 6.3 | 8.7 |

As can be seen from the above table 7, different initiation systems can be used in the powder coating compositions of the present invention. Also, the resin system may be varied and therefore different resin and co-crosslinker combinations may be employed.

The results from table 7 also show that the amount of inhibitor used in the initiation system may be varied.

Example 3

Use of Additives

TABLE 8

The influence of the use of additives (pigment and flow agent) in the powder coating composition of the invention.

| Exp-# | 3.1 | 3.2 | 3.3 |
|---|---|---|---|
| Resin | B | B | B |
| Co-crosslinker | I | I | I |
| Initiator | BPO | BPO | BPO |

TABLE 8-continued

The influence of the use of additives (pigment and flow agent) in the powder coating composition of the invention.

| Exp-# | 3.1 | 3.2 | 3.3 |
|---|---|---|---|
| | 37.2 mmol/kg | 37.2 mmol/kg | 37.2 mmol/kg |
| Pigment (Kronos 2310) | — | — | 33.3 wt % |
| Flow agent (Byk-361 N) | — | 0.8 wt % | 0.8 wt % |
| $T_{>50\ ADR}$ (° C.) | 85 | 85 | 85 |
| $T_{>70\ ADR}$ (° C.) | 90 | 90 | 90 |

As can be seen from table 8, the powder coating composition may comprise additives without affecting the cure temperature needed to obtain an acceptable cure ($T_{>50\ ADR}$ remains less than 130° C.).

The compositions with additives were applied both on an aluminum substrate (ALQ panel) and on an oak veneer substrate. The coated substrates were cured for 25 minutes at 100° C. and a good cure was obtained as the coatings could withstand 100 ADR. This example therefore shows that the powder coating compositions of the invention are particularly suitable for coating of heat-sensitive substrates such as wood.

Example 4

Itaconic Acid Based Polyester Resin

TABLE 9

Itaconic acid based polyester resin used both as resin and as co-crosslinker.

| Exp-# | 4.1 | 4.2 |
|---|---|---|
| Resin | F | F |
| Co-crosslinker | — | I |

TABLE 9-continued

Itaconic acid based polyester resin used both as resin and as co-crosslinker.

| Exp-# | 4.1 | 4.2 |
|---|---|---|
| Initiator | BPO 61.3 mmol/kg | BPO 61.3 mmol/kg |
| $T_{>50\ ADR}$ (° C.) | 120 | 100 |
| $T_{>70\ ADR}$ (° C.) | 130 | 110 |
| Reactivity initiator in BDDMA (min) | 101 | 101 |

As can be seen from table 9, the itaconic acid based polyester resin can homopolymerize and thus the resin and the co-crosslinker may be the same.

Example 5

Different Co-crosslinkers

TABLE 10

Different co-crosslinkers.

| Exp-# | 5.1 | 5.2 | 5.3 | 5.4 |
|---|---|---|---|---|
| Resin | D | D | D | D |
| Co-crosslinker | III | I | II | IV |
| Initiator | Laurox™ S 85.3 mmol/kg | Laurox™ S 85.3 mmol/kg | BPO 85.3 mmol/kg | BPO 85.3 mmol/kg |
| Theoretical WPU co-crosslinker | 504 | 204 | 383 | 580 |
| State co-crosslinker | Amorphous | Crystalline | Amorphous | Amorphous |
| Tg or Tm of the co-crosslinker | Tg = 24° C. | Tm = 90° C. | Tg = 30° C. | Tg = 41° C. |
| $T_{>50\ ADR}$ (° C.) | 85 | 80 | 95 | 110 |
| $T_{>70\ ADR}$ (° C.) | 90 | 90 | 100 | 115 |

As can be seen from table 10, different co-crosslinkers may be used in the powder coating composition of the present invention. Also, both amorphous and crystalline co-crosslinkers may be employed.

Example 6

Influence of the WPU of the Resin System, the WPU of the Resin and the WPU of the Co-crosslinker on the Curing Temperature Needed to Get an Acceptable Powder Coating

TABLE 11

Influence of the WPU

| | Exp-# | | | |
|---|---|---|---|---|
| | 6.1 | 6.2 | 6.3 | comparative example 6.1 |
| Resin | B | K | H | J |
| Co-crosslinker | I | II | I | V |
| Initiator | BPO | BPO | BPO | BPO |
| Theoretical WPU co-crosslinker | 204 | 383 | 204 | 630 |
| Actual WPU co-crosslinker | 1210 | 286 | 210 | 870 |
| Actual WPU resin | 530 | 1061 | 1130 | 1170 |
| WPU resin system (calculated from theoretical WPU co-crosslinker and the actual WPU of the resin) | 367 | 722 | 667 | 900 |
| Actual WPU resin system | 370 | 724 | 670 | 1020 |
| $T_{>50\ ADR}$ (° C.) | 90 | 115 | 115 | 150 |
| $T_{>70\ ADR}$ (° C.) | 100 | 120 | 120 | 160 |

As can be seen from the above table 11, the WPU of the resin system as determined using $^1$H NMR (actual WPU) needs to be below 1000, preferably below 900. Furthermore, it is preferred that the WPU of the resin as determined using $^1$H NMR (actual WPU) is below 1170 and/or the WPU of the co-crosslinker as determined using $^1$H NMR (actual WPU) is below 870 g/mol, preferably 630 g/mole.

Example 7

Effect of the Amount of Initiation System Used

TABLE 12

Effect of the amount of initiation system used.

| | Exp-# | | | | | | | | |
|---|---|---|---|---|---|---|---|---|---|
| | 7.1 | 7.2 | 7.3 | 7.4 | 7.5 | 7.6 | 7.7 | 7.8 | 7.9 |
| Resin | C | C | C | C | C | C | C | C | C |
| Co-crosslinker | I | I | I | I | I | I | I | I | I |
| Initiator BPO (mmol/kg) | 1.5 | 2.8 | 5.7 | 11.4 | 23.0 | 37.2 | 88.7 | 175.2 | 262.8 |
| $T_{>50\ ADR}$ (° C.) | >160 | >160 | 140 | 115 | 100 | 85 | 80 | 80 | 80 |
| $T_{>70\ ADR}$ (° C.) | >160 | >160 | 150 | 120 | 105 | 90 | 90 | 85 | 85 |

As can be seen from table 12, the person skilled in the art can easily determine using routine experimentation the minimum amount of initiation system required to cure a powder coating composition to an acceptable degree ($T_{>50\ ADR}$ (° C.) is below 130° C.).

The invention claimed is:
1. A heat curable powder coating composition suitable for being cured at a temperature from 60 to 130° C. comprising:
a thermal initiation system and a resin system; wherein the reactivity of the thermal initiation system is such that the thermal initiation system provides a geltime between 2.5 and 1000 minutes at 60° C. in butane diol-dimethacrylate as measured according to DIN 16945:1989-03 using 1 wt % of the thermal initiation system in 99 wt % of butane diol-dimethacrylate; and wherein the amount of thermal initiation system is chosen such that when the powder coating composition is applied to a substrate and cured at a temperature of 130° C. for 20 minutes, the resulting coating resists at least 50 acetone double rubs; and wherein the resin system comprises a resin and a co-crosslinker; and wherein the resin contains reactive unsaturations which are carbon carbon double bonds connected directly to an electron withdrawing group; and wherein the resin is a polyester; and wherein the co-crosslinker is chosen from the group of acrylates, methacrylates, vinylesters, vinylethers, vinyl amides, alkyn ethers, alkyn esters, alkyn amides, alkyn amines, propargyl ethers, propargyl esters, itaconates, enamines and mixtures thereof; and wherein the weight per unsaturation (WPU) of the co-crosslinker is higher than 150 and lower than 870 g/mole as determined using $^1$H NMR; and wherein the weight per unsaturation in the resin system is between 100 and 1000 g/mole as determined using $^1$H NMR; and wherein the powder coating composition is a one component system.

2. The composition according to claim 1, wherein the geltime is at least 6 minutes and less than 1000 minutes.

3. The composition according to claim 1, wherein the thermal initiation system comprises a peroxide.

4. The composition according to claim 3, wherein, the peroxide is any of the following initiators: peranhydrides, peroxydicarbonates.

5. The composition according to claim 1, wherein the reactive unsaturations are based on fumaric acid, maleic acid and/or itaconic acid.

6. The composition according to claim 1, wherein the reactive unsaturations are based on fumaric acid and/or maleic acid.

7. The composition according to claim 1, wherein the thermal initiation system comprises hydroquinones or catechols.

8. The composition according to claim 1, wherein the co-crosslinker is chosen from the group of vinylethers, vinylesters, methacrylates, acrylates, itaconates and mixtures thereof.

9. The composition according to claim 1, wherein the co-crosslinker is chosen from the group of vinylethers, vinylesters, itaconates and mixtures thereof.

10. The composition according to claim 1, wherein the co-crosslinker is chosen from the group of vinylethers, vinylesters and mixtures thereof.

11. The composition according to claim 10, wherein the resin has an acid value of less than 5 mg KOH per g resin.

12. The composition according to claim 1, wherein the co-crosslinker is a vinylether.

13. The composition according to claim 12, wherein the resin has an acid value of less than 5 mg KOH per g resin.

14. The composition according to claim 1, wherein the resin has a hydroxyl value in the range of from 0 to 70 mg KOH per g resin.

15. The composition according to claim 1, wherein the weight per unsaturation of the co-crosslinker is higher than 150 g/mole and lower than 650 g/mole.

16. The composition according to claim 1, wherein the weight per unsaturation of the co-crosslinker is higher than 150 g/mole and lower than 630 g/mole.

17. The composition according to claim 1, wherein the weight per unsaturation of the resin is less than 1500 g/mole as determined using $^1$H NMR.

18. The composition according to claim 1, wherein the weight per unsaturation of the resin is less than 1150 g/mole as determined using $^1$H NMR.

19. The composition according to claim 1, wherein the weight per unsaturation of the co-crosslinker is higher than 150 g/mole and lower than 630 g/mole and wherein the weight per unsaturation of the resin is less than 1150 g/mole.

20. The composition according to claim 1, wherein the resin and the co-crosslinker are the same.

21. The composition according to claim 1, wherein the resin and the co-crosslinker are the same and the thermal initiation system comprises hydroquinones or catechols.

22. The composition according to claim 1, wherein the resin is a polyester based on fumaric acid, wherein the co-crosslinker is a vinylether and wherein the thermal initiation system comprises a perdicarbonate and a hydroquinone.

23. The composition according to claim 22, wherein the perdicarbonate is di(4-t-butylcyclohexyl)peroxydicarbonate or dimyristyl peroxydicarbonate, and wherein the hydroquinone is tert-butylhydroquinone or 2,3,5-trimethylhydroquinone.

24. The composition according to claim 1, wherein the resin is a polyester based on fumaric acid, wherein the co-crosslinker is a vinylether and wherein the thermal initiator is benzoyl peroxide.

25. The composition to claim 1, wherein the thermal initiation system comprises transition metal compounds of transition metals with atomic numbers from/equal to 21 up to/equal to 79.

26. The composition according to claim 1, wherein the thermal initiation system comprises transition metal compounds of Mn, Fe, Co or Cu.

27. The composition according to claim 1, wherein the thermal initiation system comprises metal salts or complexes or mixtures thereof of Mn, Fe, Co or Cu.

28. The composition according to claim 1, wherein the resin has a glass transition temperature of at least 40° C. as measured via DSC at a heating rate of 5° C./min.

29. The composition according to claim 1, wherein the resin has a glass transition temperature of at least 45° C. as measured via DSC at a heating rate of 5° C./min.

30. The composition according to claim 1, wherein the resin has a glass transition temperature of at least 40 and of at most 65° C. as measured via DSC at a heating rate of 5° C./min.

31. The composition according to claim 1, wherein the resin has a number average molecular weight in the range of from 1500 to 8000 Da.

32. The composition according to claim 1, wherein the resin has a number average molecular weight in the range of from 2100 to 4000 Da.

33. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and a number average molecular weight in the range of from 1500 to 8000 Da and a glass transition temperature of at least 40° C. as measured via DSC at a heating rate of 5° C./min; and the co-crosslinker has a WPU higher than 150 g/mole and lower than 630 g/mole and said co-crosslinker is chosen from the group of vinylethers, vinylesters and mixtures thereof.

34. The composition according to claim 33, wherein the reactive unsaturations of the resin are based on fumaric acid and/or maleic acid.

35. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and a number average molecular weight in the range of from 1500 to 8000 Da and a glass transition temperature of at least 40° C. as measured via DSC at a heating rate of 5° C./min; and
the co-crosslinker has a WPU higher than 150 g/mole and lower than 630 g/mole and said co-crosslinker is chosen from the group of vinylethers, vinylesters and mixtures thereof; and
the thermal initiation system comprises an inhibitor.

36. The composition according to claim 35, wherein the reactive unsaturations of the resin are based on fumaric acid and/or maleic acid.

37. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and a number average molecular weight in the range of from 1500 to 8000 Da and a glass transition temperature of at least 40° C. as measured via DSC at a heating rate of 5° C./min; and
the co-crosslinker has a WPU higher than 150 g/mole and lower than 630 g/mole and said co-crosslinker is a vinylether.

38. The composition according to claim 37, wherein the reactive unsaturations of the resin are based on fumaric acid and/or maleic acid.

39. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and a number average molecular weight in the range of from 1500 to 8000 Da and a glass transition temperature of at least 40° C. as measured via DSC at a heating rate of 5° C./min; and
the co-crosslinker has a WPU higher than 150 g/mole and lower than 630 g/mole and said co-crosslinker is a vinylether; and
the thermal initiation system comprises an inhibitor.

40. The composition according to claim 39, wherein the reactive unsaturations of the resin are based on fumaric acid and/or maleic acid.

41. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and an acid value of less than 10 mg KOH per g resin, and a number average molecular weight in the range of from 1500 to 8000 Da and a glass transition temperature of at least 40° C. as measured via DSC at a heating rate of 5° C./min; and
the co-crosslinker has a WPU higher than 150 g/mole and lower than 630 g/mole and said co-crosslinker is a vinylether.

42. The composition according to claim 41, wherein the reactive unsaturations of the resin are based on fumaric acid and/or maleic acid.

43. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and an acid value of less than 5 mg KOH per g resin, and a number average molecular weight in the range of from 1500 to 8000 Da and a glass transition temperature of at least 40° C. as measured via DSC at a heating rate of 5° C./min; and
the co-crosslinker has a WPU higher than 150 g/mole and lower than 630 g/mole and said co-crosslinker is a vinylether.

44. The composition according to claim 43, wherein the reactive unsaturations of the resin are based on fumaric acid and/or maleic acid.

45. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and an acid value of less than 10 mg KOH per g resin, and a number average molecular weight in the range of from 1500 to 8000 Da and a glass transition temperature of at least 40° C. as measured via DSC at a heating rate of 5° C./min; and
the co-crosslinker has a WPU higher than 150 g/mole and lower than 630 g/mole and said co-crosslinker is a vinylether; and
the thermal initiation system comprises an inhibitor.

46. The composition according to claim 45, wherein the reactive unsaturations of the resin are based on fumaric acid and/or maleic acid.

47. The composition according to claim 1, wherein
the reactive unsaturations of the resin are based on maleic acid, fumaric acid, itaconic acid, acrylic acid and/or methacrylic acid, said resin has a hydroxyl value in the range of from 0 to 70 mg KOH per g resin and an acid value of less than 5 mg KOH per g resin, and a number average molecular weight in the range of from 1500 to 8000 Da and a glass transition temperature of at least 40° C. as measured via DSC at a heating rate of 5° C./min; and
the co-crosslinker has a WPU higher than 150 g/mole and lower than 630 g/mole and said co-crosslinker is a vinylether; and
the thermal initiation system comprises an inhibitor.

48. The composition according to claim 47, wherein the reactive unsaturations of the resin are based on fumaric acid and/or maleic acid.

49. A process for the preparation of a powder coating composition according to claim 1 comprising the steps of:
(a) mixing the components of the powder coating composition to obtain a premix;
(b) heating the premix to obtain an extrudate;
(c) cooling down the extrudate to obtain a solidified extrudate; and
(d) breaking the solidified extrudate into smaller particles to obtain the powder coating composition.

50. A process for coating a substrate comprising the following steps:

(1) applying a powder coating composition according to claim 1 to a substrate to obtain a coated substrate; and
(2) heating the coated substrate.

51. A substrate that is fully or partially coated with a powder coating composition according to claim 1.

52. The substrate according to claim 51, wherein the substrate is a heat-sensitive substrate.

53. The substrate according to claim 52, wherein the heat-sensitive substrate is wood.

54. The substrate according to claim 52, wherein the heat-sensitive substrate is plastic.

\* \* \* \* \*